United States Patent Office 3,314,912
Patented Apr. 18, 1967

3,314,912
EPOXY RESIN COMPOSITIONS CONTAINING TRI-ORGANO PHOSPHATE DILUENTS
Claude Thomas Bean, Jr., Niagara Falls, and Norman Bedziner, Buffalo, N.Y., assignors to Hooker Chemical Corporation, Niagara Falls, N.Y., a corporation of New York
No Drawing. Filed Jan. 23, 1963, Ser. No. 253,300
12 Claims. (Cl. 260—30.6)

This invention relates to novel epoxy resin compositions having a superior balance of physical properties. In another aspect, the invention relates to a method for improving the properties of epoxy resins. In still another aspect, the invention relates to novel reactive diluents for use in epoxy resin compositions.

The utility of epoxy resin compositions has often been limited by the relatively high viscosity of a particular composition despite its otherwise good properties for a given application. Viscosity, for example, to a large degree limits the utility of certain epoxy resins. In the manufacture of coatings, it is desirable to use coating formulations having a range of viscosities which are neither so low that the formulation flows freely from the surface being coated, nor so high that it is difficult to apply the coating. Also, if the coating is to be applied by spraying, a low viscosity formulation is preferable; but when the coating is to be applied by brushing or a similar procedure, a higher viscosity material is more desirable. In the preparation of moldings and castings, low viscosity epoxide formulations are often desirable because they quickly and completely fill the mold, and are generally more capable of accepting larger amounts of solid fillers and pigments.

In the past, non-reactive solvents have been employed to reduce the viscosities of epoxy reins, but these have been found undesirable because of the necessity to remove the solvent when converting the epoxide formulation to a resin. Various reactive diluents have been used in epoxy resins, but these have generally been found to adversely affect the otherwise desirable properties of epoxy resins. One such reactive diluent that has been employed is triphenylphosphite. Not only is this compound somewhat inefficient in reducing the viscosity of epoxy resin compositions, but it has been found to adversely affect certain thermal properties, in particular heat distortion temperature, of cured epoxy resins.

Accordingly, it is an object of this invention to provide improved reactive diluents for use in epoxy resin compositions.

It is another object of the invention to provide epoxy resin compositions having improved properties.

It is a further object of the invention to provide uncured, epoxy resin compositions having reduced viscosity, thereby rendering them suitable for many commercial applications.

It is a further object of the invention to provide cured epoxy resin compositions that are resistant to attack by organic solvents.

These and other objects of the invention will become more apparent upon a consideration of the following detailed specification.

In accordance with this invention, improved epoxy resin systems are provided by incorporating in an epoxy resin a neutral phosphorus ester having at least one methoxy group attached directly to the phosphorus atom. Included in this definition are compounds having the following formula:

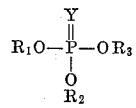

wherein Y is selected from oxygen and sulfur, $R_1$ and $R_2$ are selected from the group consisting of methyl and phenyl, and $R_3$ is methyl; provided that when $R_1$ is phenyl, $R_2$ and $R_3$ taken together can form an ethylene group. Compounds included within this definition are: trimethyl phosphate, dimethylphenylphosphate, methyl diphenylphosphate, phenyl ethylene phosphate, trimethyl thionophosphate, dimethyl phenyl thionophosphate, methyl diphenyl thionophosphate, and phenyl ethylene thionophosphate. Mixtures of such compounds are contemplated in this invention. In accordance with the invention, the foregoing phosphorus compounds can be incorporated in the uncured epoxy resin, together with suitable catalysts, curing agents and other desired additives, and thereafter subjected to curing conditions to provide the cured epoxy resin composition.

The polymers suitable for use in this invention are any of those materials known in the art as epoxy resins. Included within this classification are resins such as the well known reaction products of a dihydric phenol and a halohydrin, epoxidized hydrocarbons, epoxidized vegetable oils, as well as naturally occurring materials of the same type containing the oxirane ring structure. By the terms "epoxy group or resin, epoxide or polyepoxide" as used herein is meant a group or compound which contains adjacent carbon atoms to which oxirane oxygen is attached, e.g.,

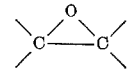

The epoxy resins that are the reaction products of a dihydric phenol and halohydrin are generally obtained by reacting at a temperature of about 50 to 150 degrees centigrade at least one mole of the halohydrin with one mole of the dihydric phenol in the presence of an alkali metal hydroxide such as sodium and potassium hydroxide, or an alkaline earth hydroxide such as calcium and barium hydroxide. It is preferred to use an excess of base, e.g., from about 1.1 to about 1.3 equivalents of base per mole of epihalohydrin. The reaction is carried out in an aqueous medium by first mixing the dihydric phenol and the base in water, followed by heating the mixture. The epihalohydrin is then added to the mixture and heating is continued with agitation for several hours to convert the reactants to an epoxy resin. The heated reaction product is washed with water to remove the base. Typical halohydrins that can be used in the preparation of the resins include monohalohydrins, such as 3-chloro-1,2-propane diol; polyhalohydrins, such as glycerol dichlorohydrin, 1,4-dichloro-2,3-dihydroxy butane, and the like; and epihalohydrins such as epichlorohydrin. Typical polyhydric phenols include the mono-nuclear phenols such as resorcinol, catechol, hydroquinone, phloroglucinol, and the like; as well as the poly-nuclear phenols such as the 2,2'; 2,3'; 2,4'; 3,3'; 3,4'; and 4.4'-isomers of dihydoxy diphenylmethane, dihydroxy diphenyl dimethylmethane, dihydroxy diphenyl ethylmethyl methane, dihydroxy diphenyl methylpropyl methane, dihydroxy diphenyl ethylphenyl methane, dihydroxy diphenyl cyclohexyl methane, polyhydric phenol formaldehyde condensation products and the like.

Another type of useful epoxy resin is formed by epoxidizing unsaturated hydrocarbons. Typical hydrocarbons useful for this purpose are the olefin polymers such as polyethylene, polypropylene, polybutadiene, copolymers of olefinic monomers such as ethylenepropylene copolymer and the like. This class of epoxy resin is prepared, for example, by reacting the unsaturated polyolefin with a suitable reactant such as acetyl peroxide for several hours at elevated temperature. This class of epoxy resin not only bears the characteristic epoxide structure, but also has other functionality such as ethylenic unsaturation. The presence of such reactive double bonds means that these resins can be cured not only by the conventional epoxy curing agents set forth hereinafter, but also can be cured by peroxide catalysts such as dicumyl peroxide and benzoyl peroxide as well, and can also be reacted with ethylenically unsaturated monomers such as styrene, vinyl toluene, methylmethacrylate and the like.

Another type of epoxy resin useful in this invention are the polyepoxides derived from naturally occurring vegetable oils, or their derivatives. Examples of these are epoxidized triglyceride such as epoxidized soybean oil, epoxidized linseed oil, epoxidized cottonseed oil, epoxidized glycerol trioleate, and the like; epoxidized diglycerides, such as epoxidized glycerol dioleate, epoxidized glycerol dilinoleate, epoxidized glycerol dilinolenate, and the like; epoxidized monoglycerides such as epoxidized glycerol monolinoleate, and the like; alkyl esters of epoxidized fatty acids such as epoxidized methyl linoleate, epoxidized ethyl linoleate, and the like. Such materials are prepared, e.g., by agitating the compound to be epoxidized with a peracetic acid solution, prepared from glacial acetic acid, 30% hydrogen peroxide and 1 percent sulfuric acid catalyst. The agitation is usually continued for several hours at elevated temperatures. The resulting epoxy compositions may be subsequently purified.

In the practice of the invention, the phosphorus compound of the invention is mixed with the desired uncured epoxy resin at room temperature or at an elevated temperature. The phosphorus compound is preferably incorporated in an amount from about 2 to about 40 parts by weight per 100 parts of uncured epoxy resin, and preferably from about 5 to about 30 parts by weight per 100 parts of uncured epoxy resin.

Various other additives can be incorporated into the epoxy resin to modify the properties of the ultimately cured resin product. Plasticizers are frequently used to improve the flexibility of the cured resins. External plasticizers such as dioctyl phthalate can be employed, but these are generally not preferred because they tend to migrate from the finished product with resultant loss in strength. It is preferred to use a reactive plasticizer that becomes an integral part of the resin system. Examples of the latter are the liquid polysulfide rubbers, liquid polyamides, and aliphatic epoxides, and aliphatic amines. The amides and amines also serve as curing agents in addition to providing additional flexibility in the cured resin system.

A variety of inert solid additives can be incorporated in the epoxy resins to further improve the properties thereof. Frequently used are reinforcing agents such as fibers in the form of cloth, mat, or chopped strands or staple. Such fibers can be of mineral origin such as glass and asbestos; of vegetable origin such as sisal and cotton; or the fibers can be synthetics such as the linear polyester fibers. Metallic fibers can also be used to advantage. Inert filler particles can be incorporated in the epoxy resins to improve heat resistance, shrinkage on curing, and thermal expansion coefficient. Suitable fillers are alumina, silica glass, calcium carbonate, quartz, iron oxide, graphite, titanium dioxide, and asbestos. Very large proportions of fillers can be incorporated into the epoxy resins, for example up to as high as 75 percent filler based on the weight of the resin. In addition to improving certain of the properties of the resins, the use of inexpensive fillers significantly lowers the manufacturing cost of products made from the resins. Thickening agents can be incorporated in the epoxy resins so that the uncured resin will not drain from an inclined or even a vertical surface. Suitable thickening agents are porous granules such as certain silicas, and bentonite; platelets such as mica; or short fibers such as asbestos or chopped glass fiber. Such additives merely thicken the epoxy liquids temporarily, and do not hamper brushing and pouring operations. Therefore, they do not defeat an important purpose of addding the phosphorus compounds of the invention to epoxy resins, i.e. viscosity reduction. In addition to the foregoing additives, a variety of colorants can also be employed. Many inorganic pigments are suitable for this purpose.

Curable mixtures are obtained by mixing a catalyst or a curing agent with the mixture of epoxy resin, phosphorus compound, and other additives. Suitable catalysts which can be employed to promote the curing of the epoxy resin compositions include basic and acidic catalysts. Typical basic catalysts are dilute alkali metal hydroxides, such as sodium hydroxide, as well as compounds such as benzyldimethylamine, benzyltrimethylammonium hydroxide. Suitable acidic catalysts include mineral acids such as sulfuric acid, phophoric acid, perchloric acid, and various sulfonic acids such as toluene sulfonic acid and the like; and the metal halide Lewis acids, such as stannic chloride, zinc chloride, borontrifluoride, and the like. Various complexes of the metal halide catalysts can also be employed. It is preferable to employ the catalyst in solution in a suitable solvent. Typical solvents for use with the basic catalysts include water, methanol, ethylene glycol, and dioxane. Typical solvents for the acidic catalysts include organic ethers such as diethyl ether, organic esters such as methylacetate, organic ketones such as acetone and organic alcohols such as methanol and cyclohexanol, and the like. The mineral acids can be employed as solutions in water. Catalyst concentrations can be varied over a wide range depending on the particular catalyst, the rate of cure desired, and the curing temperature to be used. Catalyst concentration generally varies from about 0.1 to 20 weight percent based on the weight of the epoxy composition. The curing temperatures vary over a wide range from 20 to about 250 degrees centigrade, but is preferably in the range of about 50 to 200 degrees centigrade.

Many types of curing agents can be employed with the epoxy resin compositions of the invention. Suitable curing agents are those organic compounds which contain two or more groups per molecule which are reactive with epoxy groups and include the following classes of compounds: polycarboxylic acids, polycarboxylic acid anhydrides, polyfunctional amines, polyhydric phenols, polyhydric alcohols, as well as mixtures thereof such as polycaboxylic acid anhydride-polyol mixtures; as well as certain other compounds such as polythiols, thio-alcohols, mercapto acids, polyisocyanates, polythioisocyanates, polyacyl halides, hydroxy carboxylic acids and the like. The following tabulation enumerates typical curing agents falling within the aforesaid classes of compounds:

| Types of Compounds | Typical Curing Agents |
| --- | --- |
| Polycarboxylic Acids. | Oxalic acid, malonic acid, succinic acid, glutaric acid, adipic acid, maleic acid, fumaric acid, isophthalic acid, and tetrachlorophthalic acid. |
| Polycarboxylic Acid Anhydrides. | Succinic anhydride, glutaric anhydride, maleic anhydride, chloromaleic anhydride, hexachlorophthalic anhydride, chlorendic anhydride, and polymeric dicarboxylic acid anhydrides. |
| Polyfunctional Amines. | Ethylamine, monoethanolamine, formamide, aniline, N-aminoethyl morpholine, ethylenediamine, diethylene triamine, triethylene tetramine, propylene diamine, 3,3'-biphenyl diamine, and piperazine. |
| Polyhydric Phenols. | Resorcinol, catechol, hydroquinone, the dihydroxy naphthalenes, the dihydroxy toluenes, tetraphydroquinone, and the bisphenols such as the aforesaid isomers of dihydroxy diphenyl methane and the like. |
| Polyhydric Alcohols. | Ethylene glycol, triethylene glycol, propylene glycol, the hexanediols, glycerol, trimethylolpropane, polyvinyl alcohols, polyalkenyl alcohols, pentaerythritol and the like. |
| Polythiols. | 1,2-ethane polythiol. |
| Thio-alcohols. | 2-mercapto ethanol. |
| Mercapto Acids. | Mercapto acidic acid. |
| Polyisocyanates. | Tolylene diisocyanate and methylene bis (4-phenylisocyanate). |
| Polythioisocyanates. | Methylene bis (4-phenyl thioisocyanate). |
| Polyacyl Halides. | Phthaloyl chloride. |
| Hydroxycarboxylic Acids. | Glycolic acid. |

The relative amounts of curing agent in the epoxide composition can be varied considerably. It is preferred to employ an amount of curing agent which contains a sufficient number of epoxy-reactive groups to react with approximately all of the epoxy groups in the epoxide composition, but higher and lower amounts of curing agent can be employed if desired. The curing temperature is preferably in the range of about 20 to about 200 degrees centigrade, but temperatures up to 250 degrees centigrade can be employed. Catalysts of the aforesaid type can be employed in conjunction with the curing agents, and in the amount specified hereinbefore, to speed the rate of cure of the resins.

The following examples are presented to further illustrate the invention, but are not intended to limit it. All parts and percentages are by weight unless specified otherwise.

*Examples 1 and 2*

In Example 1, trimethyl phosphate, and in Example 2, trimethyl thionophosphate were incorporated in various proportions in an uncured, commercial epoxy resin comprising the reaction product of epichlorohydrin and 4,4'-dihydroxy diphenyl methane. The viscosity of the several mixtures was measured in stokes at 25 degrees centigrade. The results appear in Table 1.

*Examples 3 to 8*

In Examples 3 through 8, the following additional phosphorus compounds were incorporated in various proportions in the epoxy resin of the preceding examples: triphenyl phosphite, triethylphosphate, tri-n-butyl phosphate, tris (chloroethyl) phosphate, tris (dichloropropyl) phosphate and tricresyl phosphate. The viscosities of these mixtures were measured and are tabulated in Table 1 for comparison with the results of Examples 1 and 2. The characteristics of the unmodified resin are also included for comparison.

*Examples 9 to 16*

Each of the mixtures of epoxy resins and phosphorus compounds prepared in Examples 1 through 8 was mixed with 8 parts of diethylene triamine catalyst and cured in the form of 10" x 4" x ¼" thick castings between aluminum plates. In the curing cycle, the castings remained at room temperature for 16 hours, then were heated for three hours at 100 degrees centigrade, followed by 2 hours at 150 degrees centigrade. Specimens of the cured resin castings were utilized for a number of physical tests.

The physical strength of the cured, epoxy resin castings was determined by measuring the heat distortion temperature in accordance with ASTM D648-56, and by measuring the Barcol hardness of specimens of 5" x ½" x ¼" thick.

The chemical resistance of the resin castings was ascertained by immersing 1.25" x ½" x ¼", weighed specimens for one week at room temperature in separate baths of: water, 10 percent aqueous sodium hydroxide solution, 30 percent sulfuric acid, toluene and acetone. The specimens that had been immersed in toluene, acetone and water were dried with an adsorbent paper towel and were then weighed to determine the loss of weight as a result of the test. The specimens that had been immersed in sodium hydroxide solution and sulfuric acid were rinsed with distilled water prior to drying with an adsorbent paper towel.

Heat stability of the cured resin casting was measured by first "post-curing" 1.25" x ½" x ¼" thick specimens at 120 degree centigrade for 16 hours, followed by heating at 160 degrees for 16 hours, and then completed by heating at 200 degrees for 16 hours. The weight loss and hardness of the specimens were measured at each stage of the heat treatment. The results of all the foregoing tests are tabulated in Table 2. The characteristics of the unmodified resin, which was cured with 12 parts diethylene triamine, are included for comparison.

TABLE 1

| Example No. | Phosphorus Compound | Parts Phos. Comp. per Hundred Resin | Viscosity at 25° C., Stokes | | |
|---|---|---|---|---|---|
| | | | Initial | After 1 Week | After 4 Weeks |
| Unmodified Resin | | | 125.3 | 140.6 | 124.6 |
| 1 | Trimethyl phosphate | 10 | 24.0 | 23.3 | 23.9 |
| | | 15 | 10.2 | 10.1 | 10.8 |
| | | 20 | 6.6 | 5.9 | 5.8 |
| | | 25 | 4.3 | 4.2 | 3.8 |
| 2 | Trimethyl thionophosphate | 10 | 16.4 | 21.1 | 22.1 |
| | | 15 | 8.8 | 9.9 | 10.1 |
| | | 20 | 6.8 | 5.8 | 6.5 |
| | | 25 | 4.7 | 4.4 | 4.6 |
| 3 | Triphenyl phosphite | 15 | 26.0 | 28.8 | 41.9 |
| | | 20 | 23.5 | 25.9 | 23.9 |
| | | 25 | 15.6 | 16.6 | 16.5 |
| 4 | Triethyl phosphate | 10 | 14.2 | 16.0 | 16.0 |
| | | 15 | 7.9 | 9.3 | 11.2 |
| | | 20 | 6.5 | 6.1 | 5.2 |
| | | 25 | 2.9 | 3.1 | 3.3 |
| 5 | Tributyl phosphate | 10 | 24.9 | 23.9 | 24.5 |
| | | 15 | 11.6 | 12.4 | 8.5 |
| | | 20 | 7.3 | 7.2 | 6.9 |
| | | 25 | 5.0 | 4.7 | 5.3 |
| 6 | Tris(chloroethyl) phosphate | 10 | 54.2 | 51.5 | 53.0 |
| | | 15 | 38.5 | 35.1 | 36.4 |
| | | 20 | 25.6 | 24.1 | 24.9 |
| | | 25 | 19.7 | 18.2 | 18.4 |
| 7 | Tris(dichloropropyl) phosphate | 10 | 108.6 | 111.1 | 113.7 |
| | | 15 | 89.4 | 82.1 | 89.2 |
| | | 20 | 85.6 | 80.2 | 85.1 |
| | | 25 | 80.2 | 78.4 | 81.4 |
| 8 | Tricresyl phosphate | 10 | 88.2 | 87.3 | 88.4 |
| | | 15 | 65.0 | 63.7 | 65.6 |
| | | 20 | 51.1 | 50.7 | 51.9 |
| | | 25 | 41.4 | 42.0 | 43.3 |

TABLE 2

| Example No. | Phosphorus Compound | Parts Phos. Comp. per Hundred of Uncured Resin | Barcol Hardness | Heat Distortion, Temp. °C. | Chemical Resistance, Wt. Percent Gain | | | | | Heat Stability | | | | | |
|---|---|---|---|---|---|---|---|---|---|---|---|---|---|---|---|
| | | | | | | | | | | 120° C. | | 160° C. | | 200° C. | |
| | | | | | Water | NaOH | H₂SO | Toluene | Acetone | Percent Wt. Loss | Hardness Change | Percent Wt. Loss | Hardness Change | Percent Wt. Loss | Hardness Change |
| Unmodified resin | | | 29.5 | 121 | 0.3 | 0.3 | 0.5 | 0.1 | 0.03 | 0.3 | +3.5 | 0.5 | −15.5 | 0.8 | −20.5 |
| 9 | Trimethyl phosphate | 10 | 35.0 | 119 | 0.7 | 0.5 | 0.8 | 0.03 | −0.07 | 0.3 | +4.0 | 0.7 | −13.0 | 1.9 | −15.0 |
| | | 15 | 37.0 | 120 | 1.7 | 1.0 | 1.6 | 0.04 | −0.1 | 0.4 | +4.0 | 0.9 | −13.5 | 2.2 | |
| | | 20 | 30.0 | 113 | 5.9 | 4.1 | 4.9 | 0.04 | −0.2 | 0.4 | +10.5 | 0.9 | −5.0 | | |
| | | 25 | 29.0 | 92 | 25.3 | 67.0 | 8.8 | 0.04 | 0.2 | 0.6 | +9.5 | 2.7 | | | |
| 10 | Trimethyl thionophosphate | 10 | 30.5 | 114 | 0.7 | 0.6 | 0.8 | 0.03 | −0.07 | 0.3 | +7.5 | 0.6 | −7.5 | 2.1 | −8.5 |
| | | 15 | 33.5 | 111 | 1.4 | 0.9 | 1.7 | 0.05 | −0.09 | 0.3 | +2.5 | 0.7 | −6.0 | 2.4 | |
| | | 20 | 35.5 | 107 | 4.9 | 3.6 | 3.0 | 0.07 | −0.03 | 0.2 | +4.0 | 0.7 | −11.0 | | |
| | | 25 | 34.5 | 97 | 13.7 | 16.0 | 6.2 | 0.13 | −0.05 | 0.2 | +6.0 | 0.7 | −8.5 | | |
| 11 | Triphenyl phosphite | 10 | 30.5 | 88 | 0.3 | 0.2 | 0.2 | 0.1 | 1.1 | 0.06 | +5.0 | 0.3 | −7.0 | 1.8 | −14.0 |
| | | 15 | 33.0 | 87 | 0.5 | 0.3 | 0.3 | 0.1 | 1.2 | 0.09 | +3.0 | 0.8 | −10.5 | 2.4 | −15.5 |
| | | 20 | 32.0 | 84 | 0.4 | 0.4 | 0.3 | 0.1 | 1.4 | 0.1 | +6.5 | 0.9 | −8.0 | 3.2 | −12.5 |
| | | 25 | 19.0 | 55 | 0.7 | 0.5 | 0.5 | 0.8 | 3.1 | 0.3 | +10.0 | 1.4 | +2.0 | 2.7 | +1.0 |
| 12 | Triethyl phosphate | 10 | 9.0 | 50 | 1.1 | 1.0 | 1.1 | 0.9 | 11.6 | 0.4 | +9.0 | 2.5 | +11.0 | 3.8 | +14.5 |
| | | 15 | 0 | <30 | 1.4 | 1.1 | 1.2 | 4.9 | 7.2 | 0.9 | +11.0 | 2.9 | −20.0 | 5.2 | −22.5 |
| | | 20 | 0 | <30 | 1.6 | 1.1 | 1.1 | 1.3 | 4.2 | 1.2 | +6.0 | 0.8 | −18.0 | 6.2 | −22.0 |
| 13 | Tributyl phosphate | 10 | 18.0 | 56 | 0.5 | 0.3 | 0.3 | 7.4 | 11.0 | 0.3 | +6.0 | 1.4 | +6.5 | 2.7 | +3.5 |
| | | 15 | 9.0 | 48 | 0.7 | 0.5 | 0.4 | 12.1 | 10.8 | 0.6 | +10.0 | 2.3 | +6.5 | 3.3 | +12.0 |
| | | 20 | 0 | 41 | 0.8 | 0.7 | 0.5 | 11.5 | 5.1 | 0.7 | +7.0 | 3.1 | +5.5 | 5.2 | +22.0 |
| | | 25 | 0 | 36 | 0.8 | 0.8 | 0.6 | 0 | 0.7 | 0.3 | 0 | 0.6 | +8.0 | 2.8 | +19.0 |
| 14 | Tris(chloroethyl)phosphate | 10 | 36.0 | 102 | 0.5 | 0.4 | 0.5 | 0.04 | 0.04 | 0.3 | −0.5 | 0.9 | +9.0 | 4.6 | |
| | | 15 | 35.5 | 88 | 0.7 | 0.3 | 0.4 | 0 | 0.5 | 0.4 | −3.5 | 1.1 | +13.5 | 6.2 | |
| | | 20 | 33.0 | 75 | 0.8 | 0.4 | 0.6 | 0 | 1.5 | 0.5 | −2.0 | 0.4 | +13.0 | 8.2 | |
| | | 25 | 31.0 | 65 | 0.3 | 0.4 | 0.4 | 0 | 0.1 | 0.2 | +1.0 | 0.6 | +8.0 | 3.0 | |
| 15 | Tris(dichloropropyl)phosphate | 10 | 38.0 | 105 | 0.4 | 0.3 | 0.3 | 0 | 1.1 | 0.2 | −7.5 | 0.4 | +2.5 | 5.8 | |
| | | 15 | 38.0 | 87 | 0.4 | 0.3 | 0.2 | 0 | 3.2 | 0.2 | −4.0 | 0.6 | +8.5 | 8.1 | |
| | | 20 | 36.0 | 77 | 0.3 | 0.3 | 0.3 | 0 | 5.4 | 0.1 | −4.5 | 0.3 | +9.5 | 10.5 | |
| | | 25 | 33.5 | 70 | 0.4 | 0.3 | 0.2 | 0 | 1.0 | 0.1 | +0.5 | 0.5 | +4.5 | 1.6 | +12.5 |
| 16 | Tricresyl phosphate | 10 | 30.5 | 90 | 0.2 | 0.2 | 0.2 | 0 | 1.3 | 0.1 | +2.0 | 0.6 | +4.5 | 2.3 | +14.0 |
| | | 15 | 29.5 | 83 | 0.2 | 0.2 | 0.1 | 0 | 4.4 | 0.09 | −1.0 | 0.8 | +2.0 | 2.9 | +12.0 |
| | | 20 | 31.0 | 77 | 0.2 | 0.1 | 0.1 | 0.04 | 4.4 | 0.1 | +2.0 | 0.6 | +6.0 | 3.6 | +15.0 |
| | | 25 | 28.5 | 71 | 0.2 | 0.1 | 0.2 | 0.3 | 7.8 | | | | | | |

The properties of the epoxy resins set forth in the following Examples 17 through 21 are modified in a manner similar to that indicated in the foregoing Examples 1 and 2, and 9 and 10, when the indicated phosphorus compounds of the invention are incorporated in the epoxy resins:

| Example No. | Phosphorus Compound | Epoxy Resin System |
|---|---|---|
| 17 | Trimethyl phosphate. | Epoxidized polyethylene resin, cured with hexahydrophthalic anhydride and benzoyl peroxide. |
| 18 | Trimethyl phosphate. | Epoxidized polyethylene resin, cured with benzoyl peroxide, and triethanolamine. |
| 19 | Trimethyl phosphate. | Epoxidized soyabean oil, cured with chlorendic anhydride. |
| 20 | Trimethyl thionophosphate. | Epoxidized linseed oil, reacted with hydroquinone, and chloromaleic anhydride. |
| 21 | Phenyl ethylene thionophosphate. | Epoxidized soyabean oil, cured with chlorendic anhydride. |

A comparison of the data obtained in the foregoing examples shows that the phosphates of the invention are much better diluents for epoxy resins than is triphenyl phosphite. It was surprising to find that when the phosphates were incorporated in the resin, the heat distortion temperature of the cured, unmodified resin was not adversely affected; whereas with triphenyl phosphite, the heat distortion temperature drops off considerably. This phenomenon indicates that the phosphates of the invention behave as true reactive diluents, whereas triphenyl phosphite has a plasticizing effect which has a deteriorating effect on the heat distortion temperature. The hardness of the phosphate-modified, cured materials of the invention is somewhat better than that of the unmodified resin. The resistance of the phosphate-modified materials of the invention to attack by toluene and acetone was significantly better than the resistance of the resin modified by triphenyl phosphite. Resistance to acetone was exceptional. Heat stability of the phosphate-modified materials of the invention was comparable to these diluted with triphenyl phosphite, and superior to the unmodified resin with respect to change in hardness.

A further comparison of the data shows the significance of having at least one methyl group bonded to the phosphorus atom through oxygen—a characteristic of the phosphorus compounds of the invention. (Phenyl ethylene phosphate,

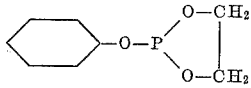

qualifies in this description by comprising one methylene group for each of the two oxygen atoms.) Comparing the results obtained with the triethyl and tributyl phosphates the data show that while the ethyl and butyl compounds effectively reduce the viscosity of uncured epoxy resins, the physical strengths of the cured resins containing the ethyl and butyl compounds is detrimentally affected, indicating that these compounds are behaving as plasticizers rather than reactive diluents. When the chloro-alkyl substituted phosphates were used, the reduction in viscosity of the uncured resin was far inferior to that obtained with any of the compounds of the invention, and was even inferior to the viscosity reduction obtained with triphenyl phosphite.

The compositions of the invention are useful in a wide variety of applications, such as in the preparation of coatings, adhesives and laminates, in molding and potting compounds, and as stabilizer-plasticizers for vinyl resins. The extent to which epoxy resins can be employed in such applications is greatly increased by the valuable properties imparted by the phosphorus compounds in this invention.

Various modifications can be made in the invention without departing from the spirit and scope thereof. Therefore, no specific limitations are to be implied by the specific details set forth in the foregoing specification.

We claim:

1. A composition consisting essentially of an uncured epoxy resin and, as a viscosity reducing diluent therefor, a phosphorus compound having the following formula:

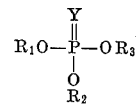

wherein Y is selected from the group consisting of oxygen and sulfur, $R_1$ and $R_2$ are selected from the group consisting of methyl and phenyl, and $R_3$ is methyl; provided that when $R_1$ is phenyl, $R_2$ and $R_3$ when taken together form an ethylene group, said phosphorus compound being present in a proportion from about 2 to about 40 parts by weight per 100 parts of the epoxy resin.

2. The composition of claim 1 wherein the phosphorus compound is trimethyl phosphate.

3. The composition of claim 1 wherein the phosphorus compound is trimethyl thionophosphate.

4. A curable composition consisting essentially of an uncured epoxy resin, a curing catalyst, and, as a viscosity reducing diluent therefor, a phosphorus compound having the following formula:

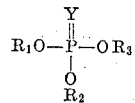

wherein Y is selected from the group consisting of oxygen and sulfur, $R_1$ and $R_2$ are selected from the group consisting of methyl and phenyl, and $R_3$ is methyl; provided that when $R_1$ is phenyl, $R_2$ and $R_3$ when taken together form an ethylene group, said phosphorus compound being present in a proportion from about 2 to about 40 parts by weight per 100 parts of the epoxy resin.

5. A curable composition comprising an uncured epoxy resin, a curing catalyst, a curing agent and, as a viscosity reducing diluent therefor, a phosphorus compound having the following formula:

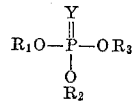

wherein Y is selected from the group consisting of oxygen and sulfur, $R_1$ and $R_2$ are selected from the group consisting of methyl and phenyl, and $R_3$ is methyl; provided that when $R_1$ is phenyl, $R_2$ and $R_3$ when taken together form an ethylene group, said phosphorus compound being present in a proportion from about 2 to about 40 parts by weight per 100 parts of the epoxy resin.

6. The cured reaction product of components consisting essentially of an epoxy resin, a curing catalyst, and, as a viscosity reducing diluent therefor, a phosphorus compound having the following formula:

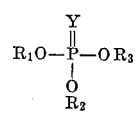

wherein Y is selected from the group consisting of oxygen and sulfur, $R_1$ and $R_2$ are selected from the group consisting of methyl and phenyl, and $R_3$ is methyl; provided that when $R_1$ is phenyl, $R_2$ and $R_3$ when taken together form an ethylene group, said phosphorus compound being present in a proportion from about 2 to about 40 parts by weight per 100 parts of the epoxy resin.

7. The cured reaction product of components consisting essentially of an epoxy resin; a curing catalyst, a curing agent and, as a viscosity reducing diluent therefor, a phosphorus compound having the following formula:

$$R_1O-\overset{\overset{Y}{\|}}{\underset{\underset{R_2}{O}}{P}}-OR_3$$

wherein Y is selected from the group consisting of oxygen and sulfur, $R_1$ and $R_2$ are selectd from the group consisting of methyl and phenyl, and $R_3$ is methyl; provided that when $R_1$ is phenyl, $R_2$ and $R_3$ when taken together form an ethylene group, said phosphorus compound being present in a proportion from about 2 to about 40 parts by weight per 100 parts of the epoxy resin.

8. The cured reaction product of claim 6 wherein the phosphorus compound is trimethyl phosphate.

9. A process for preparing an improved, cured epoxy resin which comprises (1) mixing a composition consisting essentially of (A) an uncured epoxy resin and, as a viscosity reducing diluent therefor, (B) a phosphorus compound having the following formula:

$$R_1O-\overset{\overset{Y}{\|}}{\underset{\underset{R_2}{O}}{P}}-OR_3$$

wherein Y is selected from the group consisting of oxygen and sulfur, $R_1$ and $R_2$ are selected from the group consisting of methyl and phenyl and $R_3$ is methyl, provided that when $R_1$ is phenyl, $R_2$ and $R_3$ when taken together form an ethylene group, said phosphorus compound being present in said composition in a proportion from about 2 to about 40 parts by weight per 100 parts of the uncured epoxy resin, with a curing catalyst; and (2) curing the resultant mixture at temperatures up to 250 degrees centigrade.

10. A process for preparing an improved, cured epoxy resin which comprises (1) mixing a composition consisting essentially of (A) an uncured epoxy resin and (B) a phosphorus compound having the following formula:

$$R_1O-\overset{\overset{Y}{\|}}{\underset{\underset{R_2}{O}}{P}}-OR_3$$

wherein Y is selected from the group consisting of oxygen and sulfur $R_1$ and $R_2$ are selected from the group consisting of methyl and phenyl, and $R_3$ is methyl, provided that when $R_1$ is phenyl, $R_2$ and $R_3$ when taken together form an ethylene group, said phosphorus compound being present in said composition in a proportion from about 2 to about 40 parts by weight per 100 parts of the uncured epoxy resin with a curing catalyst and a curing agent; and (2) curing the resultant mixture at a temperature in the range of 20 to 200 degrees centigrade.

11. The process of claim 10 wherein the phosphorus compound is trimethyl phosphate.

12. The process of claim 10 wherein the phosphorus compound is trimethyl thionophospate.

References Cited by the Examiner

UNITED STATES PATENTS 2,894,923  7/1959  Graham _____ 260—45.7

FOREIGN PATENTS 903,932  8/1962  Great Britain.

OTHER REFERENCES

Celanese (I): "Product Bulletin," No. CEF–7/OB 8–1, Dec. 12, 1957.

Celanese (II): "New Product Bulletin," No. N–78–OB 0–39, Nov. 1, 1960.

St. Cyr: "Hydroxy Alkyl Phosphate Esters as Curing Agent for Epoxy Resins," SPE Transactions, January 1961; pp. 74–51, relied on.

MORRIS LIEBMAN, *Primary Examiner.*

WILLIAM H. SHORT, *Examiner.*

T. D. KERWIN, J. E. CALLAGHAN,
*Assistant Examiners.*